United States Patent
Ha et al.

(10) Patent No.: US 11,042,291 B2
(45) Date of Patent: *Jun. 22, 2021

(54) TEXT INPUT METHOD IN TOUCH SCREEN TERMINAL AND APPARATUS THEREFOR

(71) Applicant: Samsung Electronics Co., Ltd., Suwon-si (KR)

(72) Inventors: Tae-Gon Ha, Seoul (KR); Hairong Zhang, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,888

(22) Filed: Oct. 28, 2019

(65) Prior Publication Data

US 2020/0057557 A1 Feb. 20, 2020

Related U.S. Application Data

(63) Continuation of application No. 15/894,366, filed on Feb. 12, 2018, now Pat. No. 10,459,626, which is a
(Continued)

(30) Foreign Application Priority Data

Nov. 15, 2011 (KR) .......... 10-2011-0118958

(51) Int. Cl.
*G06F 3/01* (2006.01)
*G06F 3/0488* (2013.01)

(52) U.S. Cl.
CPC .......... *G06F 3/04883* (2013.01); *G06F 3/018* (2013.01); *G06F 3/0488* (2013.01); *G06F 3/04886* (2013.01)

(58) Field of Classification Search
CPC .... G06F 3/018; G06F 3/0488; G06F 3/04883; G06F 3/04886
See application file for complete search history.

(56) References Cited

U.S. PATENT DOCUMENTS

| | | | |
|---|---|---|---|
| 7,369,702 B2 | 5/2008 | Abdulkader et al. | |
| 8,537,129 B2 | 9/2013 | Adamson et al. | |

(Continued)

FOREIGN PATENT DOCUMENTS

| | | |
|---|---|---|
| CN | 101118472 A | 2/2008 |
| CN | 101620480 A | 1/2010 |

(Continued)

OTHER PUBLICATIONS

Communication from a foreign patent office in a counterpart foreign application, Korean Intellectual Property Office, "Notice of Preliminary Rejection," Application No. KR 10-2011-0118958, dated Aug. 23, 2017, 9 pages.

(Continued)

*Primary Examiner* — Xuemei Zheng
(74) *Attorney, Agent, or Firm* — Jefferson IP Law, LLP

(57) ABSTRACT

A method and an apparatus input test in a touch screen terminal. The method comprises designating a certain region on a keyboard interface picture, not permitting text input through a keyboard when touch drag started from the designated region is sensed and acquiring a path of the touch drag, acquiring a path of following touch drag when at least the one or more following touch drag are sensed, and reading out at least the acquired one or more paths by cursive character recognition, deducing a character, determining the deduced character as an input target, and permitting the text input through the keyboard.

17 Claims, 4 Drawing Sheets

Related U.S. Application Data continuation of application No. 15/399,629, filed on Jan. 5, 2017, now Pat. No. 9,921,744, which is a continuation of application No. 13/678,323, filed on Nov. 15, 2012, now Pat. No. 9,569,091.

(56) References Cited

U.S. PATENT DOCUMENTS

| | | | |
|---|---|---|---|
| 8,547,354 B2 * | 10/2013 | Koch | G06F 3/04886 |
| | | | 345/173 |
| 2006/0033719 A1 | 2/2006 | Leung et al. | |
| 2006/0044259 A1 * | 3/2006 | Hotelling | G06F 1/1616 |
| | | | 345/156 |
| 2007/0075978 A1 * | 4/2007 | Chung | G06F 3/0237 |
| | | | 345/173 |
| 2007/0091070 A1 | 4/2007 | Larsen | |
| 2007/0097095 A1 | 5/2007 | Kim et al. | |
| 2011/0246927 A1 | 10/2011 | Im | |
| 2012/0056814 A1 | 3/2012 | Sudo | |
| 2012/0069027 A1 | 3/2012 | Yamazaki et al. | |
| 2012/0113023 A1 | 5/2012 | Koch et al. | |
| 2012/0242579 A1 | 9/2012 | Chua | |

FOREIGN PATENT DOCUMENTS

| | | |
|---|---|---|
| CN | 102033682 A | 4/2011 |
| CN | 102193736 A | 9/2011 |
| KR | 10-2000-0024489 A | 5/2000 |
| KR | 10-2001-0096061 A | 11/2001 |
| KR | 10-2006-0135056 A | 12/2006 |
| KR | 10-2011-0072818 A | 6/2011 |
| KR | 10-2011-0072819 A | 6/2011 |

OTHER PUBLICATIONS

Third Non-Final Office Action dated Apr. 6, 2016 in connection with U.S. Appl. No. 13/678,323; 13 pages.
Third Office Action dated Mar. 23, 2016 in connection with Chinese Patent Application No. 2012104281185; 27 pages.
Second Final Office Action dated Nov. 16, 2015 in connection with U.S. Appl. No. 13/678,323; 12 pages.
Second Non-Final Office Action dated Jun. 29, 2015 in connection with U.S. Appl. No. 13/678,323; 12 pages.
Second Office Action dated Sep. 22, 2015 in connection with Chinese Patent Application No. 2012104281185; 28 pages.
First Office Action dated Feb. 3, 2015 in connection with Chinese Patent Application No. 2012104281185; 31 pages.
First Final Office Action dated Jan. 12, 2015 in connection with U.S. Appl. No. 13/678,323; 14 pages. pages.
First Non-Final Office Action dated Jul. 24, 2014 in connection with U.S. Appl. No. 13/678,323; 18 pages. pages.
Korean Office Action dated Feb. 11, 2019, issued in Korean Application No. 10-2011-0118958.

* cited by examiner

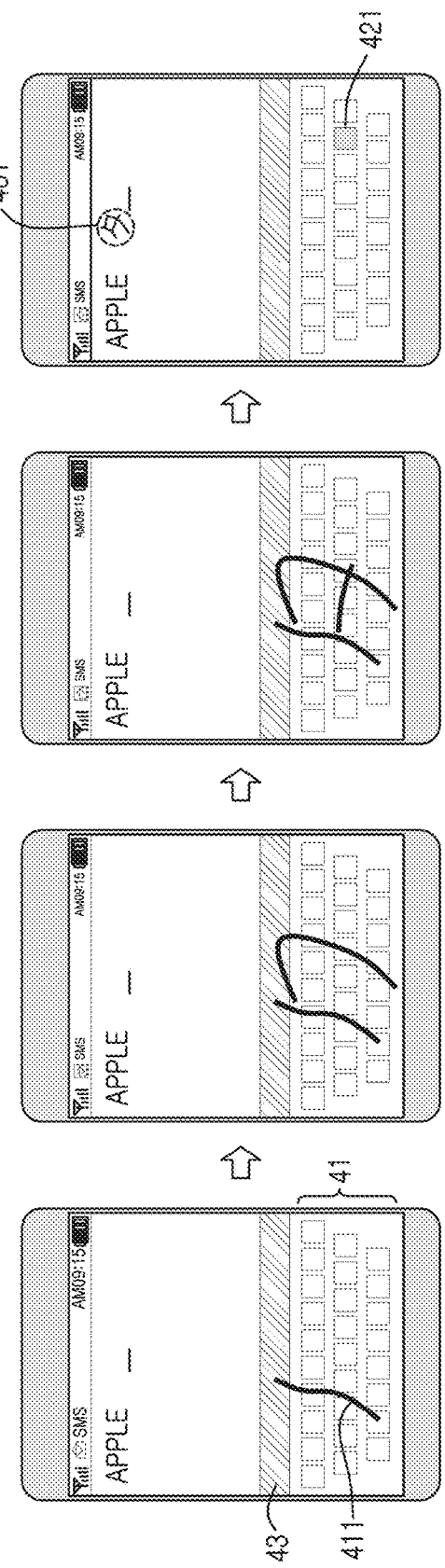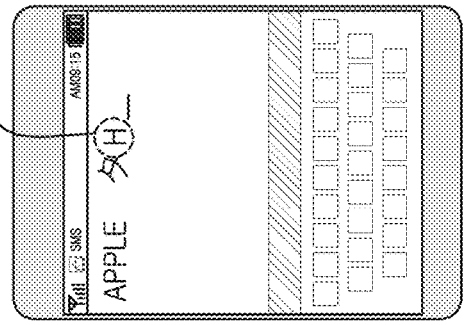

TEXT INPUT METHOD IN TOUCH SCREEN TERMINAL AND APPARATUS THEREFOR

CROSS-REFERENCE TO RELATED APPLICATION(S) AND CLAIM OF PRIORITY

The present application is a continuation of prior U.S. application Ser. No. 15/894,366, filed on Feb. 12, 2018, which has issued as U.S. Pat. No. 10,459,626 on Oct. 29, 2019; which is a continuation of prior U.S. application Ser. No. 15/399,629, filed on Jan. 5, 2017, which has issued as U.S. Pat. No. 9,921,744 on Mar. 20, 2018; which is a continuation of prior U.S. application Ser. No. 13/678,323, filed on Nov. 15, 2012, which has issued as U.S. Pat. No. 9,569,091 on Feb. 14, 2017; and was based on and claimed priority under 35 U.S.C. § 119(a) of a Korean patent application filed in the Korean Intellectual Property Office on Nov. 15, 2011 and assigned Serial No. 10-2011-0118958, the entire disclosure of which is hereby incorporated by reference.

TECHNICAL FIELD OF THE INVENTION

The present disclosure relates to a text input method in a touch screen terminal and an apparatus therefor.

BACKGROUND OF THE INVENTION

Portable terminals such as mobile terminals (cellular phones), electronic schedulers, and personal complex terminals have become necessities of current society based on development of electronic communication industries. The portable terminals have developed into important means of information transmission, which are quickly changed.

As everyone knows, recently, because utilization of a touch screen portable terminal is enhanced, the trend in a text input type is toward a text input method through a touch screen.

FIG. 1 illustrates interface pictures for text input in a conventional touch screen portable terminal.

Referring to FIG. 1, the touch screen portable terminal provides a keyboard interface picture and a cursive character recognition interface picture. The keyboard interface picture includes a keyboard 11 and an input window 13 for displaying characters received through the keyboard 11. Also, the cursive character recognition interface picture includes a cursive character recognizer 14 for receiving touch drag and an input window 15 for reading out the touch drag and displaying a deduced character.

In general, a user must convert and use the keyboard interface picture and the cursive character recognition interface picture. Therefore, this results in an inconvenience to the user.

SUMMARY OF THE INVENTION

To address the above-discussed deficiencies of the prior art, it is a primary object to provide a method and apparatus for permitting text input using a keyboard and cursive character recognition.

Another aspect of the present disclosure is to provide a method and apparatus for permitting text input using cursive character recognition on a keyboard interface display or picture.

In accordance with an aspect of the present disclosure, a text input method in a touch screen terminal is provided. The text input method includes designating a certain region on a keyboard interface display or picture, not permitting text input through a keyboard when touch drag started from the designated region is sensed and acquiring a path of the touch drag, acquiring a path of following touch drag when at least the one or more following touch drag are sensed, and reading out at least the acquired one or more paths by cursive character recognition, deducing a character, determining the deduced character as an input target, and permitting the text input through the keyboard.

In accordance with another aspect of the present disclosure, a text input apparatus in a touch screen terminal is provided. The text input apparatus includes a controller for designating a certain region on a keyboard interface display or picture, not permitting text input through a keyboard when touch drag started from the designated region is sensed, and acquiring a path of the touch drag, wherein the controller acquires a path of following touch drag when at least the one or more following touch drag is sensed and wherein the controller reads out at least the acquired one or more paths by cursive character recognition, deduces a character, determines the deduced character as an input target, and permits the text input through the keyboard.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A, 4B, 4C, 4D, and 4E illustrate interface displays or pictures for text input according to various embodiments of the present disclosure.

DETAILED DESCRIPTION OF THE INVENTION

FIGS. 2 through 4E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, well-known functions or constructions are not described in detail since they would obscure the invention in unnecessary detail. Also, the terms used herein are defined according to the functions of the present disclosure. Thus, the terms may vary depending on user's or operator's intension and usage. That is, the terms used herein must be understood based on the descriptions made herein.

The present disclosure described hereinafter relates to a method and apparatus for permitting text input using a keyboard and cursive character recognition without converting an interface picture.

Figure 1:
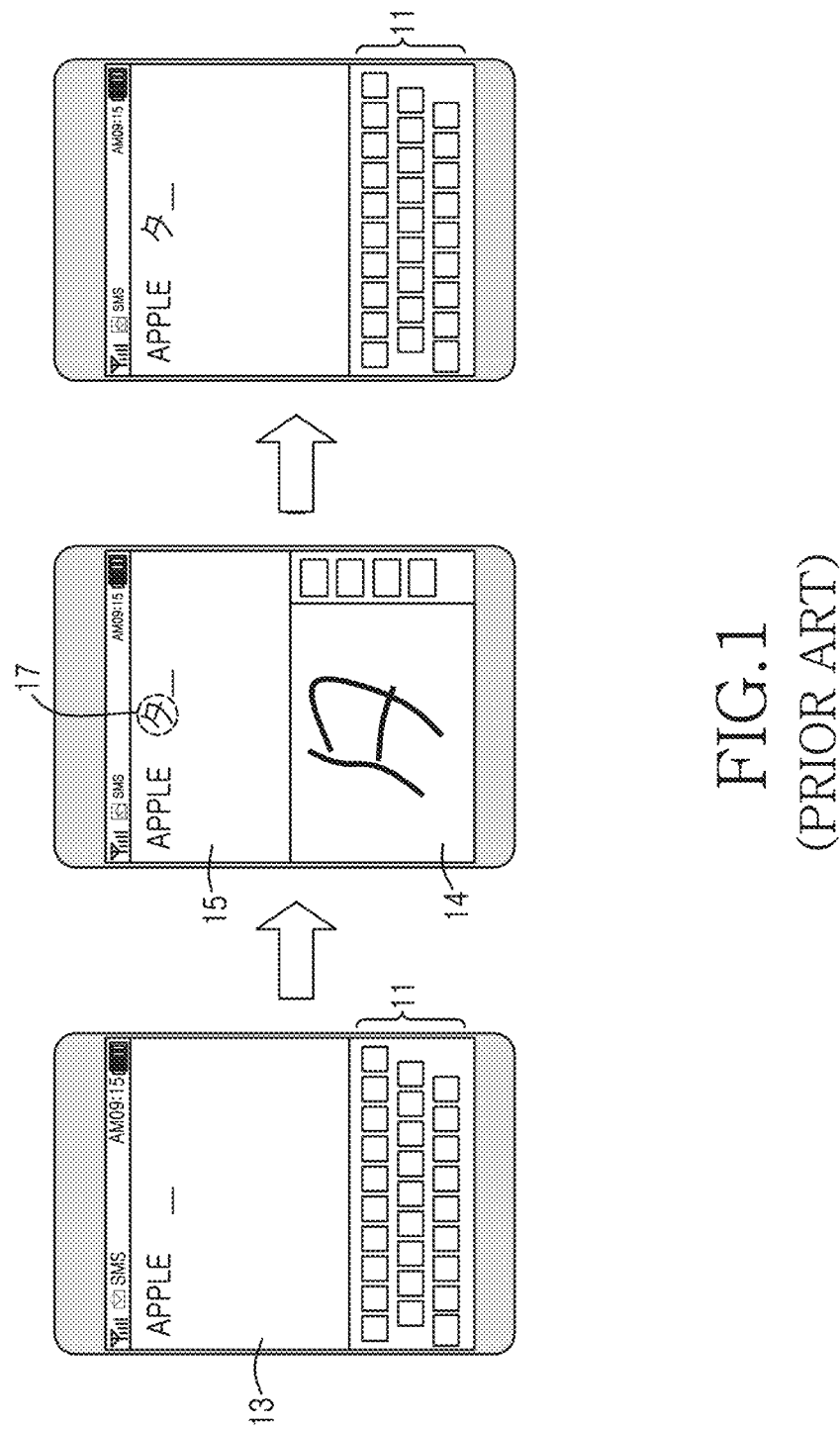
FIG. 1 illustrates interface pictures for text input in a conventional touch screen portable terminal.
Figure 2:
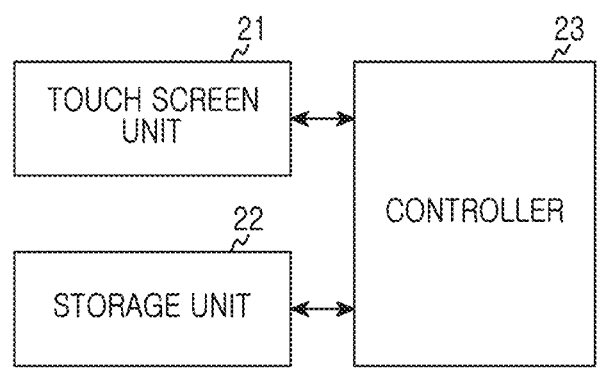
FIG. 2 illustrates a block diagram of a portable terminal according to one embodiment of the present disclosure.

FIG. 2 illustrates a block diagram of a portable terminal according to one embodiment of the present disclosure.

Referring to FIG. 2, the portable terminal includes a touch screen unit 21, a storage unit 22, and a controller 23.

The touch screen unit 21 receives an output signal and outputs the received output signal as an image under control of the controller 23. In addition, the touch screen unit 21 receives touch of a user and outputs an input signal to the controller 23. The controller 23 performs an operation according to the input signal.

The storage unit 22 stores programs for controlling an overall operation of the portable terminal and a variety of data items input and output when a control operation of the portable terminal is performed.

The controller 23 controls an overall operation of the portable terminal.

Hereinafter, a method of inputting characters in the controller 23 according to one embodiment of the present disclosure will be described in detail.

Figure 3:
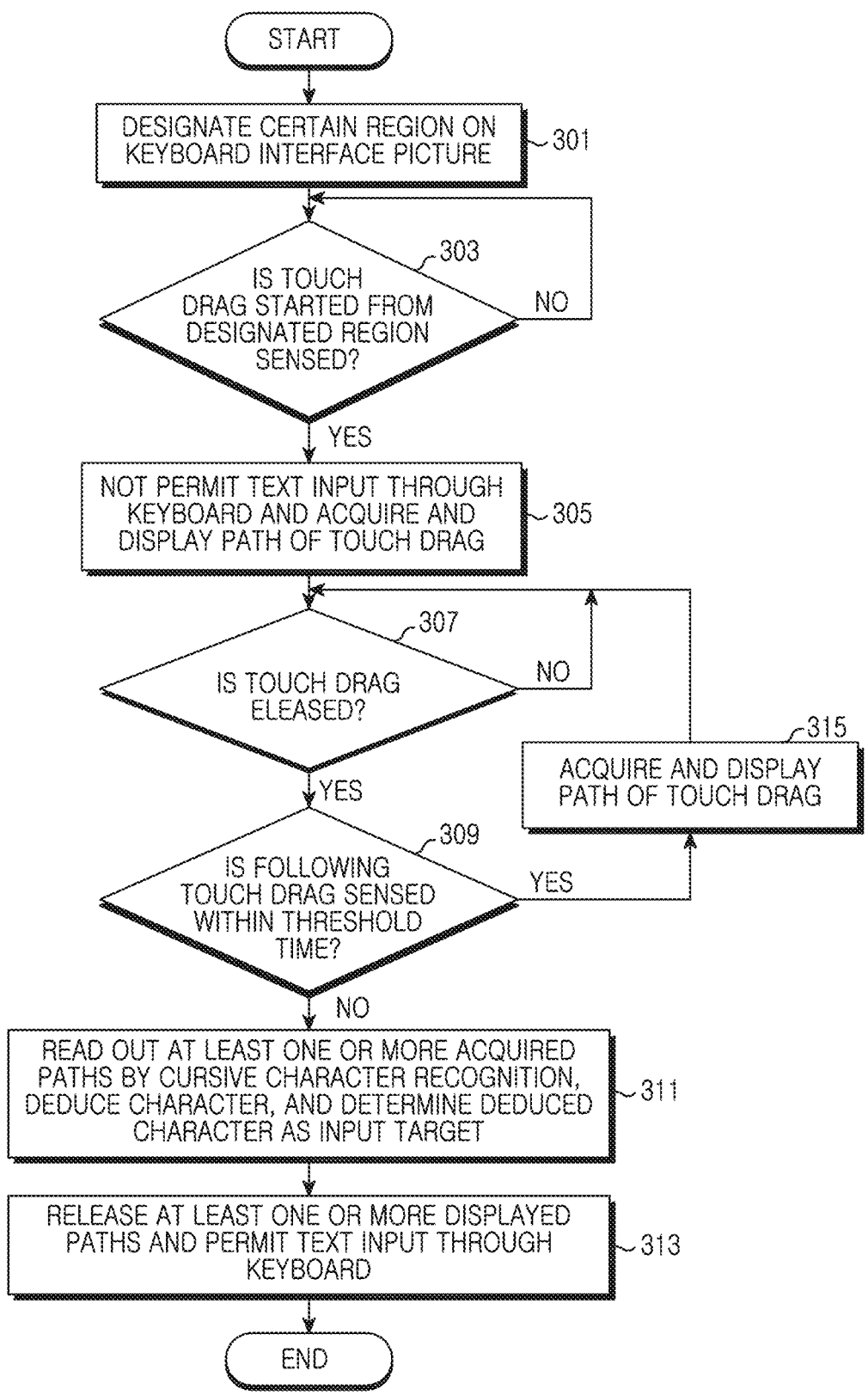
FIG. 3 illustrates a process of inputting characters according to one embodiment of the present disclosure.

FIG. 3 illustrates a process of inputting characters according to one embodiment of the present disclosure.

Referring to FIG. 2 and FIG. 3, the controller 23 designates a certain region on a keyboard interface display or picture in step 301. The controller 23 may allow a user to determine a range or position of the region.

When touch drag started from the designated region is sensed in step 303, the controller 23 proceeds to step 305, does not permit text input through a keyboard, and acquires and displays a path of the touch drag. For example, the touch drag started from the designated region may or may not be gotten out of the designated region.

When release of the touch drag is sensed in step 307, the controller 23 proceeds to step 309 and verifies whether there is following touch drag within a threshold time. When the following touch drag is sensed within the threshold time in step 309, the controller 23 proceeds to step 315 and acquires and displays a path of the following touch drag. The controller 23 performs the processing from step 307.

When the following touch drag is no longer sensed within the threshold time in step 309, the controller 23 proceeds to step 311, reads out at least the one or more acquired paths by cursive character recognition, deduces a character, and determines the deduced character as an input target. For example, the controller 23 displays the deduced character on an input window of the keyboard interface display or picture in step 311.

The controller 23 releases at least the one or more displayed paths and permits text input through the keyboard in step 313.

When the path of the touch drag is displayed, the controller 23 displays the path of the touch drag on the keyboard interface picture. For example, the controller 23 may display the path of the touch drag on an overlay display or picture or may display the path of the touch drag on the keyboard interface display or picture itself.

FIGS. 4A, 4B, 4C, 4D, and 4E illustrate interface displays or pictures for text input according to various embodiments of the present disclosure.

Referring to FIG. 2 and FIGS. 4A, 4B, 4C, 4D, and 4E, the controller 23 provides a keyboard 41 and an input window 42 for displaying characters input through the keyboard 41. In addition, the controller 23 provides a designated region 43 arranged with the keyboard 41 and the input window 42.

As shown in FIG. 4A, a user starts touch drag 411 from the designated region 43. The controller 23 does not permit text input through a keyboard and performs cursive character recognition.

As shown in FIGS. 4A, 4B, and 4C, when the cursive character recognition is performed, the controller 23 acquires at least one or more paths of the touch drag, reads out the acquired paths, and deduces a character. The controller 23 acquires at least one or more paths of the touch drag until the previous touch drag is released and there are no longer touch drag within a threshold time. Particularly, the controller 23 displays a sensed path of the touch drag on a picture of the display of the keyboard 41, the input window 42, and the designated region 43. After FIG. 4A, the controller 23 provides the entire picture as a region of the touch drag for the cursive character recognition.

As shown in FIG. 4D, when there is no longer touch drag within the threshold hold after the previous touch drag is released, the controller 23 reads out at least the one or more acquired paths, deduces the character, and displays the deduced character 431 on the input window 42. In addition, the controller 23 permits text input through the keyboard 41 again. As shown in FIGS. 4D and 4E, when a button 421 is touched, the controller 23 displays a mapped corresponding character 432 on the input window 42.

In conclusion, because text input using cursive character recognition is permitted on a keyboard interface picture, a text input method and an apparatus therefor according to one embodiment of the present disclosure solve the trouble of converting the keyboard interface display or picture into the cursive character recognition interface picture or converting the cursive character recognition interface picture into the keyboard interface picture.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method for inputting text in an electronic device including a touch screen, the method comprising:
designating an input window, a keyboard, and a designated region between the input window and the keyboard on the touch screen;
detecting whether a touch is started from the keyboard or the designated region;
in response to detecting the touch from the keyboard, detecting a key on the keyboard corresponding to the detected touch, identifying a first character corresponding to the detected key, and inputting the first character; and in response to detecting the touch from the designated region, disabling text input through the keyboard, acquiring one or more paths of the touch on the keyboard and the designated region, identifying a second character using character recognition based on the acquired one or more paths, inputting the second character, and enabling the text input through the keyboard in response to inputting the second character.

2. The method of claim 1, further comprising displaying the one or more paths of the touch.

3. The method of claim 2, further comprising removing the displayed one or more paths of the touch after inputting the second character.

4. The method of claim 1, wherein the inputting of the second character which is identified using character recognition based on the acquired one or more paths is performed in response to identifying that no touch is sensed within a threshold time after a previous touch is released.

5. The method of claim 1, wherein the designating of the designated region comprises determining a range or position of the designated region.

6. An electronic device comprising:

a controller configured to:

designate an input window, a keyboard, and a designated region between the input window and the keyboard on a touch screen;

detect whether a touch is started from the keyboard or the designated region;

in response to detecting the touch from the keyboard, detect a key in the keyboard corresponding to the detected touch, identify a first character corresponding to the detected key, and input the first character; and in response to detecting the touch from the designated region, disable text input through the keyboard, acquire one or more paths of the touch on the keyboard and the designated region, identify a second character using character recognition based on the acquired one or more paths, input the second character, and enable the text input through the keyboard in response to inputting the second character.

7. The electronic device of claim 6, wherein the controller is configured to display the one or more paths of the touch.

8. The electronic device of claim 7, wherein the controller is configured to remove a display of the one or more paths of the touch after inputting the second character.

9. The electronic device of claim 6, wherein the controller is configured to input the second character which is identified using character recognition based on the acquired one or more paths in response to identifying that no touch is sensed within a threshold time after a previous touch is released.

10. The electronic device of claim 6, wherein the controller is configured to receive an input from a user to designate a range or position of the designated region in designating the designated region on the touch screen.

11. The electronic device of claim 6, wherein the controller is configured to receive an input from a user to designate the designated region on the touch screen for disabling the text input through the keyboard and enabling drag inputs.

12. An electronic device comprising:

a touch screen configured to display a keyboard; and a controller configured to:

designate an input window, the keyboard, and a designated region between the input window and the keyboard on the touch screen;

detect whether a drag input is started from the keyboard or the designated region; and in response to detecting the drag input from the designated region, disable text input through the keyboard, acquire one or more paths of the drag input on the keyboard and the designated region, identify a character using character recognition based on the acquired one or more paths, input the character, and enable the text input through the keyboard in response to inputting the character through the keyboard and the designated region.

13. The electronic device of claim 12, wherein the touch screen is configured to display the one or more path of the drag input.

14. The electronic device of claim 12, wherein the touch screen is configured to display the one or more path of the drag input on an overlay region on the keyboard.

15. The electronic device of claim 12, wherein the touch screen is configured to display the one or more paths of the drag input on the displayed keyboard.

16. The electronic device of claim 12, wherein the controller is configured to remove a display of the one or more paths of the drag input after inputting the character.

17. The electronic device of claim 12, wherein the controller is configured to identify the character in response to identifying that no drag input has been sensed within a threshold time after a previous drag input is released.

* * * * *